Figure 3:
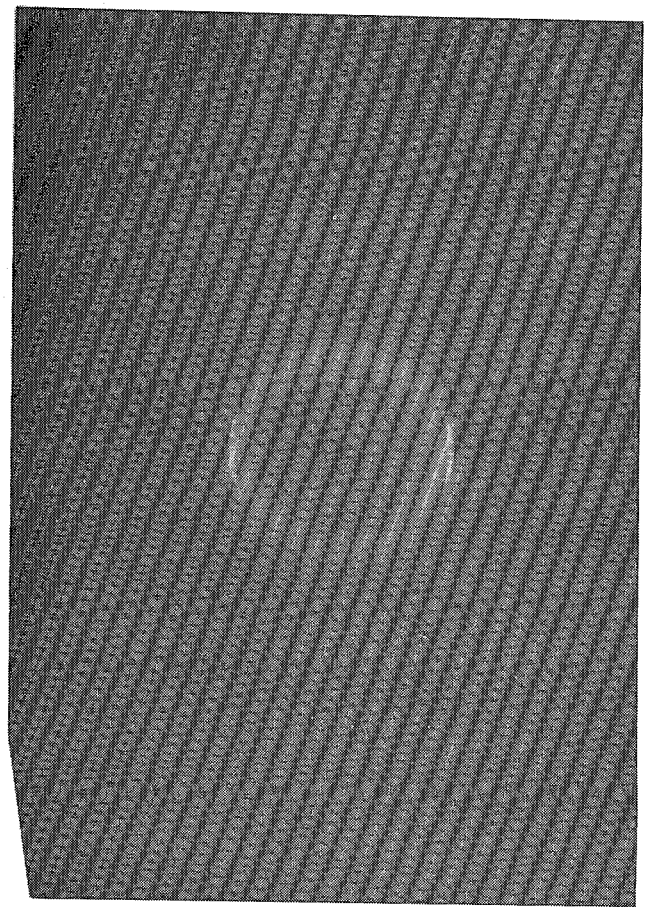

May 30, 1967 W. NUDENBERG ETAL 3,322,746
EMULSION POLYMERIZATION OF POLYBUTADIENE
Filed April 29, 1964 2 Sheets-Sheet 1
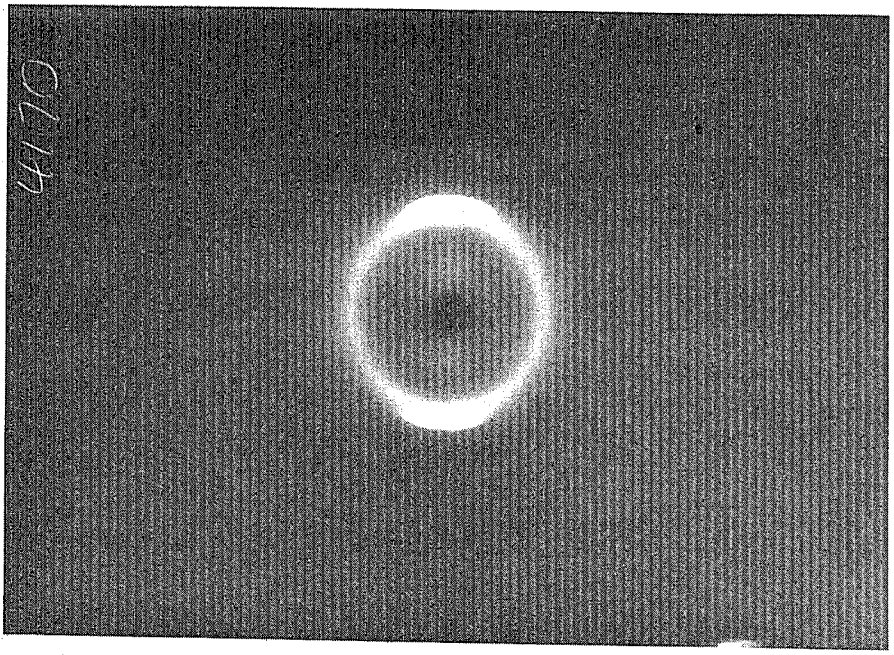
FIG.1
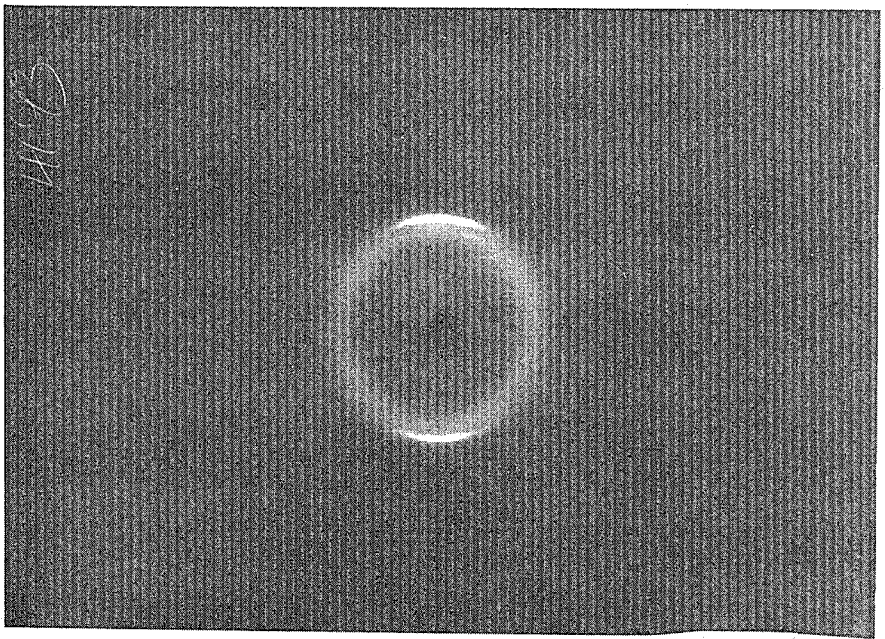
FIG.2
INVENTORS
WALTER NUDENBERG
HERBERT JAY GOLDSTEIN
PETER PAUL SALATIELLO
BY 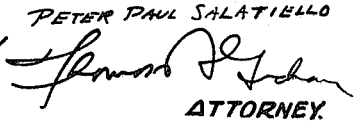
ATTORNEY.

3,322,746
EMULSION POLYMERIZATION OF
POLYBUTADIENE
Walter Nudenberg, West Caldwell, Herbert Jay Goldstein, Rockaway, and Peter Paul Salatiello, Morris Plains, N.J., assignors to Texas-U.S. Chemical Company, Parsippany, N.J., a corporation of Delaware
Filed Apr. 29, 1964, Ser. No. 363,575
4 Claims. (Cl. 260—94.3)

The present invention is directed to a novel polybutadiene and to a process for preparing said polybutadiene.

Polybutadiene rubber has been extensively investigated, and useful polybutadiene rubbers have been prepared by solution processes. Polymerization of polybutadiene by an emulsion process has been of interest because of the advantages inherent in emulsion processes. All prior attempts to prepare useful polybutadiene by emulsion processes have been unsuccessful. When a polymer was prepared having acceptable physical characteristics it was found to be not amenable to processing by conventional rubber working techniques. When a polymer was prepared having acceptable processing characteristics, it did not have acceptable physical properties. Thus, it was found that emulsion polybutadiene produced by prior physical processes, e.g., that disclosed on page 100 of the September 1950 issue of Chemical Engineering, even when produced with a Mooney viscosity (ML-4 @ 212° F.) of 25, had poor processing characteristics and had to be blended with other available materials to obtain satisfactory vulcanizate properties.

It is an object of the present invention to provide a novel polybutadiene prepared by emulsion polymerization. It is also an object of the present invention to provide an emulsion prepared polybutadiene having superior physical properties. It is still a further object of this invention to provide an emulsion prepared polybutadiene which has good processing characteristics. This invention also contemplates providing such polybutadienes, which may be oil-extended to produce an oil-extended synthetic rubber having satisfactory physical properties. It is also an object of the present invention to provide a process for producing novel polybutadienes.

This invention contemplates providing polybutadiene prepared by an emulsion process. The polybutadiene is characterized by its orientable crystallinity, as shown by X-ray diffraction, reflecting a high degree of linearity in its polymer chains; its excellent processing characteristics; and its capacity for oil extension.

FIGURES 1, 2, and 3 are X-ray diffraction pictures respectively of the emulsion polybutadiene of this invention, of an emulsion polybutadiene made with an iron pyrophosphate activator, and an emulsion polybutadiene made with an iron pyrophosphate activator in the presence of nitrobenzene.

For these pictures, an unvulcanized sample of purified polymer was extended to 300% elongation at 0° C. and then subjected to X-ray diffraction analysis at −30° C. in the usual manner. The sharply defined rings and spots are indicative of the X-ray diffraction patterns from oriented crystalline regions of the polymer. Such X-ray diffraction analysis is a well recognized technique for demonstrating the orientable crystallization of linear polymers and is used to distinguish linearity from non-linearity.

The characteristic crystallinity and related linearity of the polymer chains results in a polymer having superior physical properties. When prepared in accordance with the emulsion process described hereinafter, the polymer (without oil extension) has a Mooney viscosity (ML-4 @ 212° F.) between 30 and 120. It has a Huggin's K' value of between about 0.35 and 0.40. It has an intrinsic viscosity, as measured in benzene solution, of between 1 and 4, and preferably between 1.5 and 3.5. Whitby defines "intrinsic viscosity" and "K" values in synthetic rubber on pages 328–330 and pages 346–347 of his book "Synthetic Rubber," John Wiley and Sons, 1954. Rubbers produced from the polymers are highly ductile and exhibit good physical properties at severe elongation.

This invention also provides an oil-extended polybutadiene having superior properties. The oil-extended polymers can contain up to 100 parts (per one hundred parts of polybutadiene) and preferably between 30 and 80 parts of a hydrocarbon extender oil. These "oils" include aromatic, naphthenic, paraffinic and liquid and solid asphalts. The preferred oils are the highly aromatic and aromatic oils. Oil-extended polybutadienes have been prepared containing between 20 parts and 88 parts of an extender, e.g. Textract 2205, an aromatic extender oil sold by Texaco, Inc., and have exhibited Mooney viscosities (ML-4 @ 212° F.) between 30 and 50, and preferably between 30 and 45, for the oil extended polybutadiene.

The polybutadiene contemplated by the present invention is prepared by a variant of the well-known cold emulsion process. The process of the invention is particularly characterized by using in combination (i) a complexed ferrous ion-sodium formaldehyde sulfoxylate activator system; together with (ii) an aromatic nitro compound, preferably nitrobenzene; (iii) a mercaptan modifier; and (iv) as a shortstop in combination, sodium hydrosulfite, sodium hydroxide and sodium nitrite. These materials are used in combination in the preferred recipe of Col. A and also within the range more broadly detailed in Col. B. All units noted in the columns are parts by weight.

|  | Col. A | Col. B |
|---|---|---|
| Butadiene | 100 | 100. |
| Water | 180 | 140 to 200. |
| Rosin acid soap | 2.02 | Total soap 2 to 10. |
| Fatty acid soap | 2.18 |  |
| Sodium salt of a condensed naphthalene sulfonic acid. | 0.19 | .10 to .20. |
| Nitrobenzene | 0.055 | 0.03 to 1, pref. 0.04 to 0.06. |
| Tetrasodium ethylenediamine tetraacetate. | 0.0520 | 0.0365 to 0.1040. |
| Potassium chloride | 0.40 | 0.30 to 0.60. |
| Sodium formaldehyde sulfoxylate | 0.0415 | 0.0291 to 0.0830. |
| Ferrous sulfate .7H$_2$O | 0.0150 | 0.1050 to 0.0300. |
| p-Menthane hydroperoxide | 0.045 | 0.0315 to 0.0900. |
| Tert-dodecylmercaptan | 0.165 | 0.1–0.275. |
| Sodium hydrosulfite | 0.6 | 0.1–1. |
| Sodium hydroxide | 0.16 | See disclosure. |
| Sodium nitrite | 0.12 | Do. |

The ferrous ion in the activator system is preferably supplied in the form of ferrous sulfate. It may also be supplied as ferrous chloride, nitrate, acetate, and acid phosphate. Other organic complexing agents may be used in addition to the ethylenediamine tetraacetate exemplified. The activator system is utilized in connection with organic peroxides which are commonly used for cold polymerizations, e.g., diacetyl peroxide, dibenzoyl peroxide, acetyl benzoyl peroxide, tertiary-butyl hydroperoxide, p-menthane hydroperoxide, p-cumene hydroperoxide, cyclohexyl benzene hydroperoxide, and diisopropyl benzene hydroperoxide. The hydroperoxides, particularly p-menthane hydroperoxide, are preferred.

The aromatic nitro compound is a mono nitro substituted monocyclic aromatic compound, such as the preferred nitrobenzene, and such substituted nitrobenzenes as those containing alkyl substituents, e.g., nitro-toluenes, and hydroxyl- and chloro-substituted nitrobenzenes (the hydroxyl and chloro groups preferentially being para-oriented to the nitro radical). Those mononitrobenzenes having a total of 12 carbon atoms or less are particularly contemplated for use in the invention.

Mercaptan modifiers are widely used in emulsion polymerization. Those most frequently used are the $C_{12}$ to $C_{16}$ mercaptans. Although primary or secondary mercaptans may be used, the tertiary mercaptans or mixtures thereof are generally preferred.

Sodium hydrosulfite is generally used in an amount between 0.1 to 1 part per 100 parts of butadiene originally present in the emulsion. The shortstop combination comprises 0.5 to 3 mols of sodium hydroxide per mol of sodium hydrosulfite and 0.1 to 2 mols of sodium nitrite per mol of sodium hydrosulfite. The shortstop combination is generally added in (2–10%) aqueous solution to the aqueous emulsion polymerizate after conversion of 50% to 80% of polymerizable monomers originally present to synthetic rubber. The shortstop combination should be added to the synthetic rubber latex to stop further polymerization before removal of any unreacted monomers. The shortstop should be added to the latex after the desired polymerization of 50% to 70% conversion and while the latex still contains unreacted monomeric material.

Those soaps generally utilized in known emulsion polymerization systems may be used in this process. These include the alkali soaps of fatty acids having ten to twenty-five carbon atoms. The preferred emulsifier is rosin acid soap (including dehydrogenated, hydrogenated, and disproportionated rosin soaps) together with fatty acid soaps (such as those derived from partially hydrogenated tallow, or refined tall oils), as illustrated in the recipe of Col. A.

A preferred process for preparing the novel polybutadiene of the present invention is described in connection with a batch polymerization of the preferred recipe of Col. A. The procedure is readily converted to continuous type operation using multiple reactors by utilizing conventional industrial practices. A soap solution is prepared by dissolving the rosin and fatty acid soaps, secondary emulsifier (sodium salt of condensed naphthalene sulfonic acid), and potassium chloride in the water and adjusting the pH with caustic to 10.2 to 10.8. The nitrobenzene, p-menthane hydroperoxide and mercaptans are dissolved in the liquified (under pressure) butadiene, and this solution is added to the soap solution and stirred until the emulsion is formed. The mixture is then cooled to 42° F. to 55° F.; and a solution of ferrous sulfate, sodium formaldehyde sulfoxylate and complexing agent in a small amount of water is added. The latex is then stirred for about 12 hours during which time the polymerization has proceeded to about 55% to 65% conversion of monomer and yields a polymer with a four minute raw Mooney viscosity at 212° F. of about 65 to 75. At this point, the reaction is shortstopped with an aqueous solution of sodium hydrosulfite, sodium hydroxide, and sodium nitrite. The polymer is thereafter coagulated, washed, and dried. Thus, where the crude synthetic rubber is to be recovered from the latex, after removal of unreacted polymerizable monomers, the latex is coagulated by conventional means, e.g., by reducing the pH of latex, which has a pH of about 8 to 11, to below 4.6, by acid coagulation with sulfuric acid.

The foregoing preferred cold polymerization process may be modified following the teachings detailed herein. The cold polymerization is carried out at temperatures between 32° F. and 86° F., and preferably between 41° F. and 55° F. The narrow range of 42° F. to 50° F. is considered optimum with the recipe of Col. A.

The rubber compositions produced using the polybutadiene prepared in accordance with this invention may include the usual compounding ingredients, e.g., fillers (carbon black, silica, etc.), extenders, pigments, anti-oxidants and anti-ozonants, flame retardants, processing aids, etc.

The polybutadienes produced in accordance with this invention have a Mooney viscosity (ML–4 @ 212° F.) as prepared, of between 30 and 120. They may be modified to the easier processing viscosity range of between 30 and 45 by oil extension, as aforesaid. They may also be modified to a value within this easier processing range by a plasticizer, or by polymerizing to low viscosity levels.

The following examples are furnished to better illustrate the invention to those skilled in the art. All parts and percentages are by weight. All parts are by 100 parts of butadiene.

Example 1

This example demonstrates the need for using both the sulfoxylate activator and the aromatic nitro compound in order to obtain the novel linear polymers of this disclosure, as indicated by the Huggin's K' value and X-ray diffraction studies.

In compiling the data shown in Table 1, a series of polymers were made up generally according to the recipe of Col. B with and without an aromatic nitro compound, and at various modifier levels. Similarly a series of polymers were made up using a pyrophosphate activator instead of the sulfoxylate activators. These also were made up with and without a nitro compound, and at various modifier levels. The pyrophosphate activator consisted of 0.150 part of ferrous sulfate heptahydrate, together with 0.225 part of potassium pyrophosphate. All parts are parts per one hundred parts of monomer both here and in the table below. The amount of peroxide used with the pyrophosphate was 0.105 part. The results follow:

TABLE 1

|  | Modifier (parts) | Viscosity (ML–4 at 212° F.) | Conversion (percent) | Intrinsic Viscosity | Huggin's K' |
|---|---|---|---|---|---|
| Sulfoxylate | 0.175 | 108 | 48 | 3.33 | 0.41 |
| Do | 0.175 | 127 | 57 | 3.75 | 0.46 |
| Do | 0.275 | 39 | 57 | 1.60 | 0.44 |
| Sulfoxylate+nitrobenzene | 0.155 | 86 | 49 | 2.74 | 0.36 |
| Do | 0.160 | 83 | 50 | 3.13 | 0.35 |
| Do | 0.145 | 108 | 58 | 2.83 | 0.35 |
| Pyrophosphate | 0.250 | 50 | 70 | 2.14 | 0.38 |
| Pyrophosphate+nitrobenzene | 0.100 | 110 | 44 | 3.50 | 0.73 |
| Do | 0.250 | 43 | 55 | 2.03 | 0.40 |

It will be noted that in each instance where the combination of sulfoxylate activator and nitro compound is used, the resulting polymer has a Huggin's K' value within the prescribed range of 0.35 to 0.40, showing the high degree of linearity of these polymers.

When an iron pyrophosphate activator system is substituted for the sulfoxylate activator system, at modifier levels between about 0.100 to about 0.200, the K' values are outside the 0.35 to 0.40 range. The use of an iron pyrophosphate activator at modifier levels near the upper limit of the specified modifier range (0.200 or greater) yields polybutadiene with K' value in the prescribed range. However, the X-ray diffraction pictures (FIGURES 2 and 3) of these pyrophosphate polymers show less intense areas of ring and spot formations than the polymer of this invention (FIGURE 1); and consequently have considerably lower levels of orientably crystallinity than the polymer herein disclosed; thereby confirming the unique linearity of applicants' polymer.

Similar X-ray diffraction results were obtained, where the sulfoxylate activator was used in the absence of a nitro compound to produce the polymer; that is, the polymers were significantly less crystalline and therefore less linear than the polymer prepared in accordance with this invention.

*Example II*

This example demonstrates the unique oil extendability of a polymer produced with sulfoxylate activator in the presence of a nitro compound. The polymers shown in table below were generally prepared according to the recipe of Col. B. The oil used for extending the polymer was a standard, commercial, highly aromatic oil supplied as a rubber extender and was added in aqueous emulsion to the polymer latex. The values shown for the oil content were determined by analysis rather than being based on the amount of oil added to the latex.

The results are as follows:

| Sample 1—With Nitrobenzene | | Sample 2—Without Nitrobenzene | |
|---|---|---|---|
| Oil (parts) | Mooney Viscosity | Oil (parts) | Mooney Viscosity |
| 0 | 108 | 0 | 108 |
| 58.2 | 43 | 45.9 | 44 |

| Sample 3—With Nitrobenzene | | Sample 4—Without Nitrobenzene | |
|---|---|---|---|
| Oil (parts) | Mooney Viscosity | Oil (parts) | Mooney Viscosity |
| 0 | 83 | 0 | 93 |
| 18.6 | 52 | 27.1 | 46 |
| 32.6 | 38 | 38.7 | 33 |
| 38.0 | 34 | 46.4 | 31 |
| 53.4 | 29 | 51.9 | 29 |

It is immediately evident from Samples 1 and 2 that the polymer of this invention (Sample 1) can hold considerably more oil (13.7 parts) than the polybutadiene of Sample 2. This contributed to the unique linearity of the novel polymer of this invention.

Samples 3 and 4 demonstrate the same thing in another way, showing that the applicants' polybutadiene (Sample 3) will hold the same amount of oil and yield the same final viscosity as a non-invention polybutadiene (Sample 4) prepared at a raw Mooney viscosity 10 points higher.

Polybutadiene compositions, other than those exemplified, produced in accordance with the process of this invention and utilizing the noted reactants as specified, exhibited the characteristic crystallinity and superior properties of the novel rubber. These novel polybutadiene rubbers have utility in the manufacture of tires, molded rubber products, etc.

As many embodiments of this invention may be made without departing from the spirit and scope thereof, it is to be understood that the invention includes all such modifications and variations as come within the scope of the appended claims.

What is claimed is:
1. An emulsion polybutadiene polymerization process comprising

(i) dissolving about
   2 to 10 parts of soap, and
   0.30 to 0.60 part of potassium chloride in 140 to 200 parts of water, and adjusting the pH to 10.2–10.8 with caustic;
(ii) dissolving about
   0.30 to 1 part of a mono nitro aromatic compound,
   0.0315 to 0.090 part of p-menthane hydroperoxide, and
   0.1 to 0.275 part of tert-dodecylmercaptan, in 100 parts of liquified butadiene,
(iii) adding said butadiene solution to the water solution and agitating until an emulsion is formed,
(iv) cooling said emulsion to between 41° F. and 55° F. and adding an aqueous solution of about
   0.1050 to 0.0300 part of ferrous sulfate .7H$_2$O
   0.0291 to 0.0830 part of sodium formaldehyde sulfoxylate, and
   0.0365 to 0.1040 part of tetrasodium ethylenediamine tetraacetate,
(v) agitating said emulsion while maintaining it within said temperature range until polymerization has proceeded to about 55% to 70% conversion of monomer.
(vi) shortstopping said polymerization by adding an aqueous solution containing about
   0.1 to 1 part of sodium hydrosulfite,
   0.5 to 3 mols of sodium hydroxide per mol of sodium hydrosulfite, and
   0.1 to 2 mols of sodium nitrite per mol of sodium hydrosulfite, and
(vii) separating the polybutadiene from said emulsion.

2. In the process for polymerizing butadiene by an emulsion process utilizing a peroxide catalyst, the improvement comprising incorporating in the emulsion
   (a) a mercaptan modifier,
   (b) a chelated ferrous ion-sodium formaldehyde sulfoxylate, activator and
   (c) a mononitrobenzene,
then polymerizing at a temperature between 32° F. and 86° F., and then using, in combination, sodium hydrosulfite, sodium hydroxide, and sodium nitrite to shortstop the polymerization.

3. The process of claim 1 wherein said polymerization is carried out at a temperature between 42° F. and 50° F.

4. The process of claim 3 wherein said polymerization is carried out at a temperature between 42° F. and 50° F.

References Cited

UNITED STATES PATENTS

| | | | |
|---|---|---|---|
| 2,613,175 | 10/1952 | Johnstone et al. | 260—29.7 |
| 2,803,623 | 8/1957 | Anderson | 260—82.3 |
| 2,970,125 | 1/1961 | Smith et al. | 260—29.7 |
| 3,015,642 | 2/1962 | Bawn et al. | 260—29.7 |
| 3,020,269 | 2/1962 | Leonard | 260—94.3 |

FOREIGN PATENTS 715,434    9/1954    Great Britain.

OTHER REFERENCES

Hobson et al.: I/EC, vol. 42, No. 8, August 1950, pp. 1572–1577.

Whitby: Synthetic Rubber, John Wiley and Sons, N.Y., 1954, pp. 354, 356.

MURRAY TILLMAN, *Primary Examiner.*

J. ZEIGLER, J. T. GOOLKASIAN, *Assistant Examiners.*

UNITED STATES PATENT OFFICE
CERTIFICATE OF CORRECTION

Patent No. 3,322,746                          May 30, 1967

Walter Nudenberg et al.

It is hereby certified that error appears in the above numbered patent requiring correction and that the said Letters Patent should read as corrected below.

Column 2, in the table, third column, line 12 thereof, for "0.1050" read -- 0.0105 --; column 6, line 7, for "0.30" read -- 0.03 --.

Signed and sealed this 18th day of March 1969.

(SEAL)
Attest:

Edward M. Fletcher, Jr.                        EDWARD J. BRENNER

Attesting Officer                             Commissioner of Patents

UNITED STATES PATENT OFFICE
CERTIFICATE OF CORRECTION

Patent No. 3,322,746            May 30, 1967

Walter Nudenberg     et al.

It is certified that error appears in the above identified patent and that said Letters Patent are hereby corrected as shown below:

Column 6, line 16, "0.1050" should read -- 0.0105 --; lir 47, for the claim reference numeral "3" should read -- 2 --.

Signed and sealed this 9th day of December 1969.

(SEAL)
Attest:

Edward M. Fletcher, Jr.          WILLIAM E. SCHUYLER, JR.
Attesting Officer                     Commissioner of Patents